F. A. BOTHWELL.
HAY PRESS.
APPLICATION FILED MAR. 23, 1915.
1,208,466.
Patented Dec. 12, 1916.
2 SHEETS—SHEET 1.
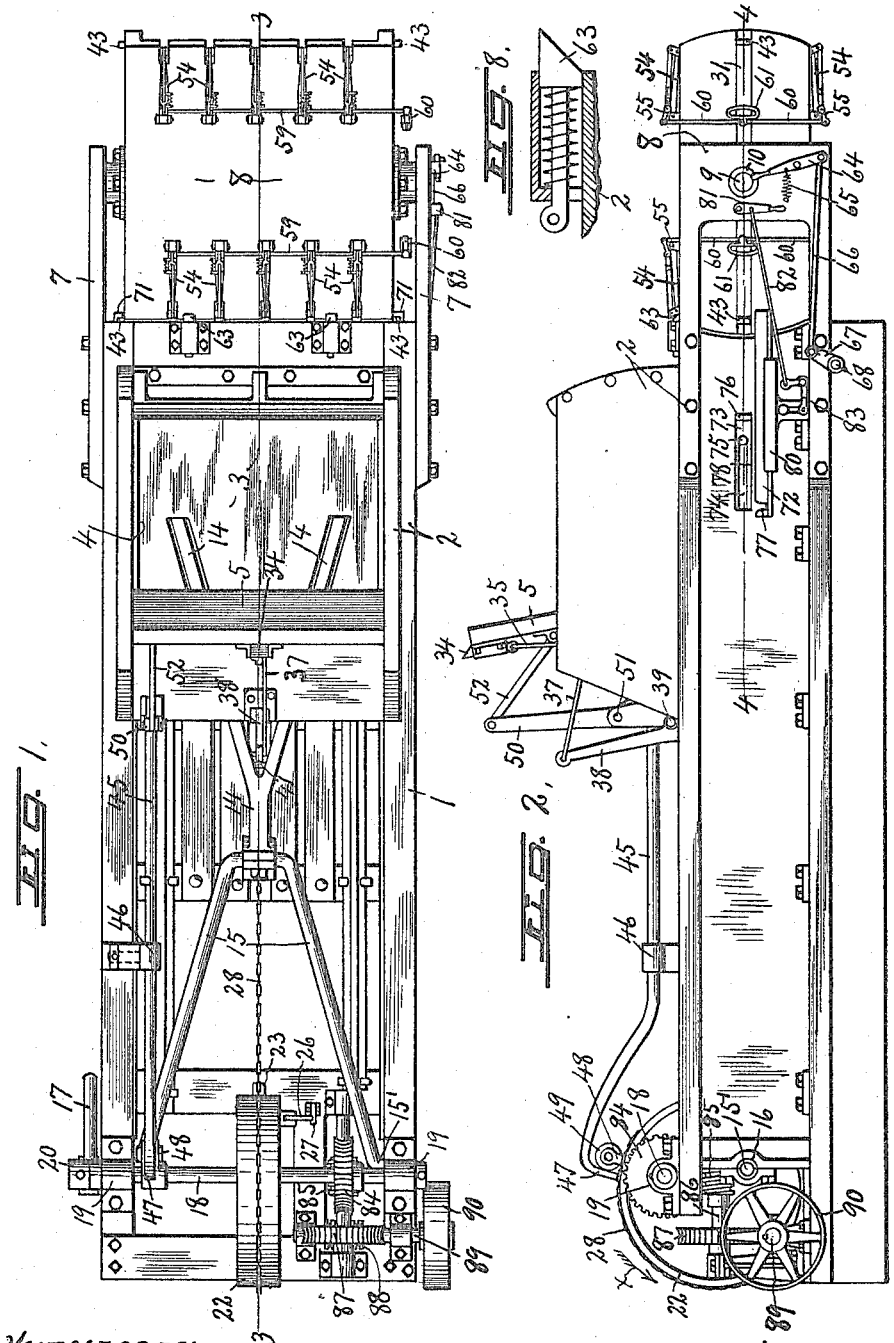
WITNESSES:
INVENTOR
F. A. Bothwell
BY
ATTORNEY.

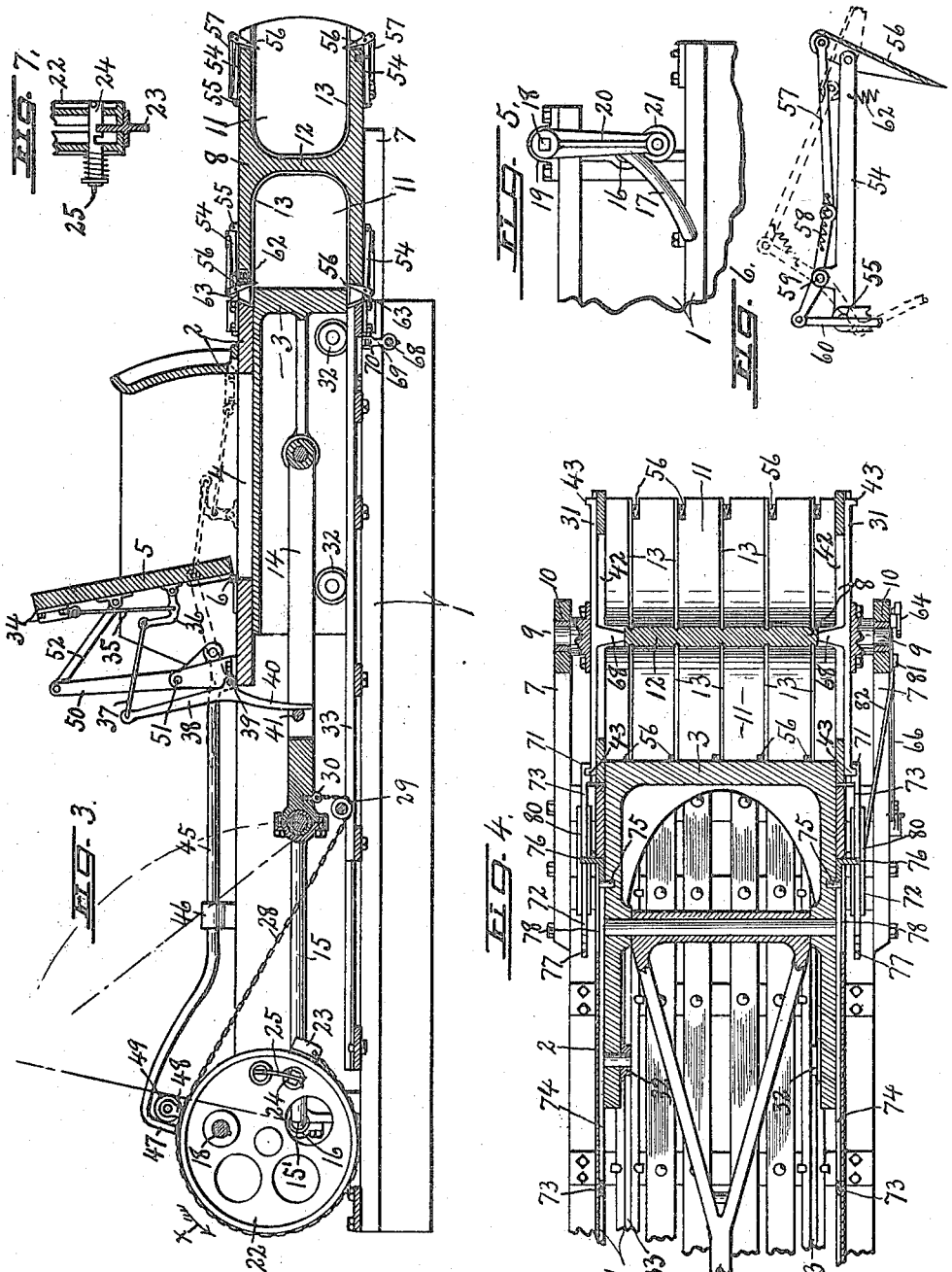

UNITED STATES PATENT OFFICE.

FRED A. BOTHWELL, OF LOCKE, NEW YORK.

HAY-PRESS.

1,208,466. Specification of Letters Patent. Patented Dec. 12, 1916.

Application filed March 23, 1915. Serial No. 16,352.

*To all whom it may concern:*

Be it known that I, FRED A. BOTHWELL, a citizen of the United States, and resident of Locke, in the county of Cayuga, in the State of New York, have invented new and useful Improvements in Hay-Presses, of which the following, taken in connection with the accompanying drawings, is a full, clear, and exact description.

This invention relates to certain improvements in baling presses for hay, straw and the like and refers more particularly to the baling box and coöperative adjuncts for directing and compressing the material therein.

The main object is to provide the baling press with a movable baling box having a plurality of compartments adjustable alternately or successively into registration with the delivery end of the receiving or piston chamber so that the material may be compressed in the registering chamber of the baling box while the material previously compressed in another one of the compartments may be wire bound and withdrawn, thereby rendering the baling operations practically continuous and materially increasing the output for a given period of time.

Another object is to provide means operable at will whereby the action of the piston or plunger may be utilized to discharge or expel the completed bales from the baling box.

A further object is to provide the baling box with suitable retainers for holding the material under compression in the baling chamber as such material is compressed therein by the piston or plunger.

A still further object is to provide automatic means for closing and opening the inlet door of the receiving chamber as the plunger is reciprocated.

Other objects and uses relating to specific parts of the apparatus will be brought out in the following description.

In the drawings Figure 1 is a top plan of a baling press embodying the essential features of my invention. Fig. 2 is a side elevation of the same apparatus. Fig. 3 is a longitudinal sectional view taken on line 3—3, Fig. 1. Fig. 4 is a horizontal sectional view of the baling box and adjacent end of the receiving chamber taken on line 4—4, Fig. 2, showing also the plunger and a portion of its operating means and the means for expelling the completed bales from the baling box. Fig. 5 is a side elevation of a portion of one end of the apparatus, showing the means for returning the plunger after each pressing operation. Fig. 6 is an enlarged face view, partly in section, of one of the hay-retaining fingers and its operating means. Fig. 7 is a detail sectional view of the clutch connection between the chain and drum of the plunger-operating means. Fig. 8 is an enlarged sectional view of one of the locking clutches for the revolving baling box.

As illustrated, this baling press comprises a main supporting frame —1— having a receiving-box —2— which, together with the frame are disposed in a substantially horizontal position and constitute a guide for receiving a suitable piston or follower —3—.

The receiving-box is provided in its upper side with an inlet opening —4— for receiving the material to be baled and is also provided with a closure —5— consisting of a door hinged at —6— to the top of the box at the rear of the opening —4— to swing vertically, the opening and closing of the door being synchronized with the movement of the piston or follower —3— presently described.

The opposite sides of the receiving-box are provided with forwardly extending arms or brackets —7— projecting some distance beyond the limit of movement of the head of the follower —3— for receiving and supporting a revoluble bale box —8— having opposite central trunnions —9— journaled in suitable bearings —10— in the outer ends of the arms —7— to rotate in a vertical plane, said bale box being provided with a plurality of, in this instance two, baling-chambers —11— in diametrically opposite ends thereof and movable longitudinally and successively into registration with the delivery end of the receiving-chamber to permit the hay, straw or other material to be compressed in the registering-chamber —11— as the follower is moved forwardly to the limit of its compression stroke, during which operation the previously formed bale in the other baling chamber may be wire-bound and expelled therefrom.

The baling chambers or compartments —11— are separated by a central partition —12— and each compartment is provided with a series of wire-receiving grooves —13— spaced uniform distances apart in parallelism and running continuously around the walls of such compartment, the corners of which are rounded as shown in Fig. 3 so that the tie wires may be inserted by hand into the grooves at one side and directed around the bale so as to emerge from the opposite side at the same open end of the compartment, whereupon the ends of the wires are drawn tightly and suitably tied in any well-known manner to effectively bind the bale.

*Plunger operating means.*—The top of the plunger —3— is of sufficient length to cover the inner side of the opening —4— when at the limit of its compression stroke, said plunger being connected by a pitman —14— to a crank arm —15— of a crank shaft —15'— which is journaled at its ends in suitable bearings —16— in opposite sides of the frame —1—, as shown more clearly in Fig. 2, one end of the rock shaft at the outside of the frame being provided with a crank arm —17—, as shown in Figs. 1 and 5.

A counter shaft —18— is journaled in suitable bearings —19— on the rear end of the main supporting frame and directly above the crank shaft —15— and is provided at one end outside of the frame with a crank arm —20— carrying a roller —21— for engagement with the crank arm —17— as the shaft —18— is rotated in the direction indicated by arrow —x—, Figs. 2 and 3, for the purpose of returning the follower or plunger —3— from its pressing position to the rear of the inlet opening —4— and allowing the hay or straw to be fed through said opening into the receiver in advance of the plunger.

The means for advancing the plunger through its compression stroke comprises a drum —22— eccentrically mounted upon the shaft —18— and provided with an annular groove in which is slidably interlocked a clutch member —23— adapted to engage a clutch bolt —24— slidable transversely in suitable ways in the drum —22— when the clutch member —23— is moved circumferentially into registration therewith. This bolt is provided with a peripheral recess movable into and out of registration with the clutch member —23— and when registered therewith serves to release said clutch member, but at other times interlocks therewith. The means for tripping the locking bolt to release the clutch member —23— consists of a lever —25— fulcrumed on one side of the drum —22— and provided with a yielding extension —26— adapted to engage an abutment —27— on the frame —1— so that when the drum is rotated in the operation of returning the plunger, the finger —26— will engage the abutment —27— and trip the bolt —24— to release the member —23—.

A chain —28— is passed around the drum and attached at one end to the clutch member —23—, while its other end is passed under a sheave —29— on the frame —1— and attached at —30—to the pitman —14—, as shown more clearly in Fig. 3.

The position of the abutment —27— is such as to trip the locking bolt —24— just before or about the time the plunger or follower reaches the limit of its compression stroke, so that under these conditions, the clutch member —23— is free to move circumferentially around and relatively to the drum —22—, thus permitting the return of the plunger and its operating members —14— and —15—, whereupon the continued rotation of the drum —22— will cause the bolt —24— to interlock with the clutch member —23— for rotating the latter, and thereby drawing down upon the pitman —14— near its pivotal connection with the crank arm —15— to force the plunger forwardly, or until the drum has made approximately one revolution to cause the tripping of the locking bolt —24— and consequent release of the clutch member —23—, these operations being repeated at each revolution of the drum.

In order that the plunger or follower —3— may be guided in its reciprocatory movement with a minimum amount of friction, it is provided with suitable rollers —32— traveling in ways —33— on the frame —1—, the bottom of the receiving box being preferably open to allow chaff and dust and other fine particles to fall therethrough.

*Door operating means.*—The door —5— for the inlet —4— is preferably closed during the greater portion of the compression stroke of the plunger or follower and is opened only as the follower reaches the limit of its compression stroke, the door being held in its closed position by one or more catches —34—.

In order that the door may be unlocked and operated automatically, the catch —34— is connected by a link —35— to an angle lever —36— on the door, said angle lever being connected by a link —37— to another lever —38— which is pivoted at —39— to the rear end of the top of the receiving-box —2— and is provided with a downward extension —40— projecting into the path of movement of a pin or shoulder —41— on the pitman —14— so that as the pitman is drawn downwardly by the cable —28—, the shoulder —41— will encounter and operate the lever —38— to unlock the latch —34— just before the plunger reaches the limit of its compression stroke. The lock releasing means is also utilized for opening the door for the reason that as the upper end of the lever is withdrawn rearwardly by the engagement of the pin —41— with the extension —40—, the link —37— and lever —36— connecting said lever —38— with the door serves to open said door to the position shown in Fig. 3. Suitable means is also provided for closing the door automatically as soon as the plunger begins its return movement, said means consisting, in this instance, of a draw-rod —45— slidable in suitable ways —46— on the frame —1— and having its rear end provided with an offset —47— in the path of movement of a crank arm —48— having a roller —49— thereon, said crank arm being secured to the shaft —18—, as shown more clearly in Fig. 1, the front end of the draw-rod being pivotally connected to the short arm of a lever —50— which is fulcrumed at —51— upon the rear end of the top of the receiving-box —2— and has the upper end of its longer arm connected by a link —52— to the door, so that as the crank arm —48— continues its rotation by the shaft —18—, the roller —49— will encounter the offset —47— and thereby force the rod —45— rearwardly until the door —5— is closed and automatically locked by the catch —34—, at which time the offset portion —47— will have been moved beyond the path of movement of the roller —49— to allow the crank arm —48— to continue its rotation ready for a repetition of the operation just described after the door has been again opened.

Suitable devices are provided on each end of the bale box —8— for retaining the compressed hay in the registering-baling chambers after each pressing operation of the plunger, each device consisting, in this instance, of a rock arm —54— running lengthwise of the bale box and pivoted at one end at —55— to suitable lugs on the outer face of said box, the opposite end of said rock arm being provided with a hay-retaining finger —56— having a pointed end extending through a slot in the adjacent side of the box and into the baling chamber for penetrating the compressed hay close to the head of the plunger —3— when the latter is at the limit of its compression stroke, as shown more clearly in Fig. 3, the upper end of said finger being connected by a link —57— to a crank arm —58— on a rock shaft —59— which is journaled in suitable bearings on the rock arm —54—.

I preferably provide the lower and upper sides of each end of the baling box —8— with separate sets of these hay-retaining devices, those of each set having a common rock shaft —59— which is extended laterally beyond one of the sides of the baling box and is provided with crank arms —60— connected at the center by a handle —61—, whereby the rock shafts —59— at the same end of the baling box may be operated simultaneously to release the fingers —56— from their holding positions when discharging the wire-bound bale from the corresponding chamber of the baling box.

It will be observed that the link —57— and crank arm —58— constitute a toggle connection between each of the fingers —56— and rock shaft —59— and that the pivotal connection between said link and crank arm is movable to opposite sides of a direct line between the plane of a pivotal connection of the link —57— and crank arm —58— and axis of the rock shaft —59—, and that the toggle joint normally rests against the upper face of the bar —54— below said direct line to automatically lock the finger —56— in its holding position.

The object in pivoting the arms —54— to the baling box in the manner shown is to permit said bars with their fingers —56— to rock upwardly as each charge of hay or straw is forced into the registering-baling chamber of the baling box, the outer faces of the fingers being normally inclined toward the closed ends of the baling chambers, so that the pressure of the hay thereagainst will automatically rock the arms —54— outwardly against the action of retracting springs —62—, as shown in Fig. 3.

The baling box —8— is normally locked in its operative position with one of its baling chambers registering with the delivery end of the receiving-box by means of spring catches —63— which are preferably mounted upon the lower and upper faces of the delivery end of the box —2— and are provided with inclined ends, similar to an ordinary door catch, adapted to be depressed against the action of their retracting springs by the adjacent portions of the baling box as the latter is swung to its operative position and to engage the lower and upper faces of said baling box automatically when registered with the delivery end of the receiving box —2—.

After the desired quantity of hay or straw has been compressed into the registering-chamber —11— by repeated operations of the follower —3—, the lower catches —63— may be tripped from their holding positions by means of a hand-lever —64— on the outer side of one of the extensions —7— of the receiving box, said lever being operable against the action of a retracting spring —65— and is connected by a link —66— to a crank arm —67— on a rock shaft —68—, the latter being journaled in suitable bearings on the under side of the main supporting frame —1— and extending transversely of said frame. This rock shaft —68— is provided with upstanding crank arms —69— which are connected by links —70— to their respective catches —63— so that all of the catches on the lower side of the registering end of the baling box are released simultaneously as the hand-lever —64— is moved against the action of the retracting spring —65—.

Immediately following the release of the baling box in the manner just described, the weight of the compressed hay in the registering end of the baling box causes the latter to rotate about its axis through approximately a quarter of a turn, the remaining half revolution being effected by the operator so as to bring the empty chamber —11— into registration with the delivery end of the baling box to permit it to be filled with hay or straw, while the end containing the bale is then at the front of the machine where it is wire-bound and then ejected in a manner presently described, it being understood that the hay or straw is being pressed in the registering chamber while the previously formed bale is being wired and ejected from the opposite chamber so that the baling operations proceed almost continuously.

The friction produced by the pressure of the hay in their respective chambers renders the removal of the bales by hand rather difficult, and I have, therefore, sought to utilize the action of the plunger for this purpose as follows.

A pair of ejector bars —31— are mounted respectively on opposite sides of the baling box —8— to slide automatically and longitudinally thereof, each ejector bar being provided with a central inwardly projecting lug normally registered with the partition —12— and movable in a slot —42— in the adjacent sides of the baling chambers, the opposite end of each bar being provided with outwardly projecting lugs —43— for interlocking engagement with the grooved end —71— of an adjustable connecting bar —72— by which the ejector bar —31— may be connected to the follower —3— through the medium of another sliding bar —73—.

I preferably provide two of these sliding bars —73— guided in lengthwise grooves or ways in opposite sides of the receiving-box —2— and provided with lengthwise slots —74— for receiving laterally projecting studs —75— on the plunger —3—, said bars having their front ends provided with outwardly projecting shoulders —76— for interlocking engagement with the rearwardly forked ends —77— of the adjacent connecting bar —73—, said shoulders —76— being guided in relatively short slots —78— in opposite sides of the receiving box —2—, as shown more clearly in Figs. 2 and 4.

The length of the slots —78— in the sides of the frame —1— or box —2— is somewhat less than the depth of each of the baling chambers, while the combined lengths of the slots —74— and —78— are approximately equal to the length of the stroke of the piston or follower —3—, the object in using the slotted bar —73— being to render the necessary openings in the sides of the receiving-box as short as possible to allow just sufficient movement of the connecting bars —72— and ejector bars —31— to expel the bales from the chambers —11— as they are successively brought to the front end of the machine.

The connecting bars —72— are slidable in horizontal ways —80— which in turn are guided in vertical ways on opposite sides of the receiver —2—, as shown more clearly in Fig. 2, said ways —80— normally holding the connecting bars —72— in a plane below or out of alinement with the plunger bars —73— and ejector bars —31—, but may be moved into interlocking connection with said bars when the bar —73— is drawn back by the pins —75— to the limit of their rearward movement or to the rear ends of the slots —78—, at which time the shoulder —76— on the bar —73— will be in vertical registration with the notched or forked end —77— of the connecting bar —72—, while the opposite forked end will be in vertical registration with the shoulder —70— on the rear end of the ejector bar —31—.

The means for shifting the connecting bar —72— into interlocking engagement with the bars —73— and —31— consists of a hand-lever —81— pivoted to one of the extensions —7— and connected by a link —82— to a bell-crank lever —83—, the latter being secured to a rock shaft which extends transversely under the receiving chamber —2— for receiving a crank arm similar to the bell-crank —83—, both of said crank arms being connected to the adjacent ways —80— for raising and lowering the same, and thereby moving the connecting bar —72— into and out of interlocking engagement with the shoulders —43— and —76— on the bars —31— and —73—, respectively.

When the connecting bar —72— is interlocked with the bars —31— and —73—, respectively, in the manner just described, it is evident that any forward movement imparted to the bar —73— by the pins —75— on the plunger will be transmitted to the ejector bar —31— for expelling the bale from the chamber at the front end of the baling box, said ejector bar being immediately returned to its normal position by the same operating means, whereupon the guideway —80— and connecting bar —72— may be withdrawn downwardly by a reverse operation of the hand-lever —81—.

The principal feature, however, of my invention consists in providing the machine with a baling box having a plurality of baling chambers movable successively or alternately into and out of registration with the delivery end of the receiving chamber, and while the door and its operating mechanism and also the ejector mechanism and locking devices are important adjuncts, I do not wish to limit myself to any particular form of movable baling box, nor to the various other mechanisms described, as it is evident that they may be materially changed without departing from the spirit of this invention.

The counter shaft —18— is provided with a worm gear —84— meshing with a worm —85— on an underlying counter shaft —86— which is journaled on the frame —1— lengthwise thereof, and is provided with a worm gear —87— meshing with a worm —88— on the main driving shaft —89—, the latter being also journaled on the frame —1— and is provided with a pulley —90— adapted to be connected by a belt to any available source of power, not shown.

What I claim is:

1. In a baling press, the combination with a substantially horizontal receiving chamber having an inlet in the top and an outlet in one end and a follower movable in said chamber, of a revoluble baling-box having a plurality of radial pockets movable successively into registration with the outlet of the receiving chamber as the box is rotated, separate sets of movable fingers, one set for each pocket for retaining the hay or other material to be baled therein as it is compressed, and separate devices operable at will for releasing the separate sets of fingers from engagement with the bale to permit the latter to be withdrawn from its pocket.

2. In a hay press, the combination of a receiving-chamber having a door in one side for permitting the passage of the loose hay into the chamber, a follower movable in said chamber, means for reciprocating said follower, means for locking the door during the compression stroke of the follower, additional means for unlocking and opening the door during the outward stroke of the follower, and a baling-box having a bale pocket movable into and out of registration with the delivery end of the receiving-chamber.

3. In a baling press, the combination of a horizontal chamber having an inlet in its top and an outlet in one end, a baling-box movable into and out of registration with the outlet, a follower movable in said chamber for forcing the material to be baled from the inlet into the baling-box, means for reciprocating the follower, a door for the inlet, and means operating in synchronism with the follower-operating means for automatically opening and closing the door.

In witness whereof I have hereunto set my hand this 19th day of February, 1915.

FRED A. BOTHWELL.

Witnesses:
H. E. CHASE,
ALICE M. CANNON.

Copies of this patent may be obtained for five cents each, by addressing the "Commissioner of Patents, Washington, D. C."